United States Patent
Sartore et al.

(10) Patent No.: US 6,671,831 B1
(45) Date of Patent: Dec. 30, 2003

(54) FAULT TOLERANT USB METHOD AND APPARATUS

(75) Inventors: Ronald H. Sartore, Poway, CA (US); Steven P. Larky, Del Mar, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 539 days.

(21) Appl. No.: 09/592,201

(22) Filed: Jun. 13, 2000

(51) Int. Cl.[7] ............................................ G06F 13/14
(52) U.S. Cl. ............................ 714/44; 714/43; 714/56
(58) Field of Search ........................... 714/44, 43, 56; 710/8

(56) References Cited

U.S. PATENT DOCUMENTS

| | | | | |
|---|---|---|---|---|
| 4,872,107 A | * | 10/1989 | Marple et al. | 711/111 |
| 5,794,032 A | * | 8/1998 | Leyda | 713/2 |
| 6,266,731 B1 | * | 7/2001 | Riley et al. | 710/313 |
| 6,336,152 B1 | * | 1/2002 | Richman et al. | 710/8 |
| 6,389,560 B1 | * | 5/2002 | Chew | 714/43 |
| 6,415,342 B1 | * | 7/2002 | Wahl et al. | 710/100 |
| 6,502,146 B1 | * | 12/2002 | Rasmussen et al. | 710/100 |
| 6,502,212 B1 | * | 12/2002 | Coyle et al. | 714/43 |
| 6,510,532 B1 | * | 1/2003 | Pelly et al. | 714/43 |

OTHER PUBLICATIONS

Ronald H. Sartore et al., Fault Tolerant USB Method and Apparatus, U.S. Ser. No. 09/592,206, filed Jun. 13, 2000.

* cited by examiner

Primary Examiner—Scott Baderman
Assistant Examiner—Anne L. Damiano
(74) Attorney, Agent, or Firm—Christopher P. Maiorana, P.C.

(57) ABSTRACT

One aspect of the present invention concerns an apparatus comprising a circuit that may be configured to present a connection signal. The connection signal may be configured to automatically disconnect and reconnect a peripheral device from a host in response to one or more errors. In another aspect of the present invention the connection signal may be configured to shift a configuration of a peripheral device in response to one or more errors.

19 Claims, 3 Drawing Sheets

FAULT TOLERANT USB METHOD AND APPARATUS

CROSS REFERENCE TO RELATED APPLICATION

The present application may relate to U.S. Ser. No. 09/592,206, filed concurrently and to U.S. Ser. No. 09/590,831, filed Jun. 9$^{th}$ 2000 which are each hereby incorporated by reference in their entirety.

FIELD OF THE INVENTION

The present invention relates to a method and/or architecture for connecting USB devices generally and, more particularly, to a method and/or architecture for fault tolerant connection of USB devices.

BACKGROUND OF THE INVENTION

Conventional USB peripheral devices can have software crashes that occur for a number of reasons. Such crashes can be catastrophic (e.g., fatal crashes that require shutdown of a program/feature). Such software crashes often require a reset of a processor within the peripheral device to recover. However, a reset portion of the processor of the peripheral device can have difficulty coordinating the reset with an outside system (e.g., pending peripheral device tasks). The reset processor of the peripheral device requires additional awareness and recovery information from host software and/or hardware to correctly reset. One such conventional method for initiating a recovery of a non-functioning USB peripheral device requires a physical disconnection of the peripheral device (e.g., disconnect and reconnect). Another conventional method for initiating a recovery requires a power cycle (e.g., a manual reset) of the host computer. While common in modern computers, particularly windows based systems, such power cycling and disconnecting is inconvenient for the user of the peripheral device and can be detrimental to the computer.

Additionally, conventional USB peripheral devices have high data transfer error rates. The high error rates can make conventional peripheral devices unreliable, inoperative, or unusable.

Conventional USB peripheral devices typically cease to operate upon malfunctions. After such malfunctions proper operation may not be attainable or sustainable, rendering the peripheral device useless. Disabled USB peripheral devices often require an operator to manually intervene. It is generally desirable to provide a method and/or architecture that may provide fault tolerant recovery without user intervention.

SUMMARY OF THE INVENTION

One aspect of the present invention concerns an apparatus comprising a circuit that may be configured to present a connection signal. The connection signal may be configured to automatically disconnect and reconnect a peripheral device from a host in response to one or more errors. In another aspect of the present invention the connection signal may be configured to shift a configuration of a peripheral device in response to one or more errors.

The objects, features and advantages of the present invention include providing a method and/or architecture for interfacing a peripheral device to a host that may provide (i) uninterrupted operation of the peripheral device, (ii) reduced and/or negligible downtime, and/or (iii) a simplistic recoverable peripheral design.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
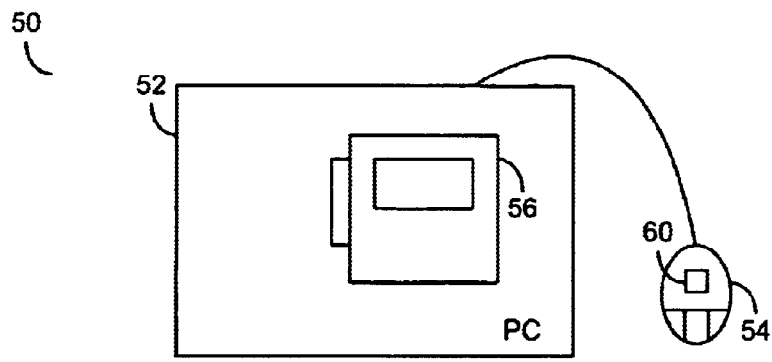
FIG. 1 is a system level diagram of a preferred embodiment of the present invention.

Referring to FIG. 1, a block diagram of a system 50 is shown in accordance with a preferred embodiment of the present invention. The system 50 generally comprises a computer (e.g., a personal computer (PC)) 52 and a peripheral device 54. The system 50 may provide fault tolerant peripheral operation. The computer 52 may include an interface 56. The peripheral device 54 may comprise a fault tolerance block (or circuit) 60. The fault tolerance circuit 60 may interface with the host device 52 (via the interface 56). In one example, the fault tolerance circuit 60 may be implemented as a fault tolerant control circuit. In another example, the interface 56 may be implemented as a PCI interface card. The fault tolerance circuit 60 may provide uninterrupted accurate operation of the peripheral device 54.

Figure 2:
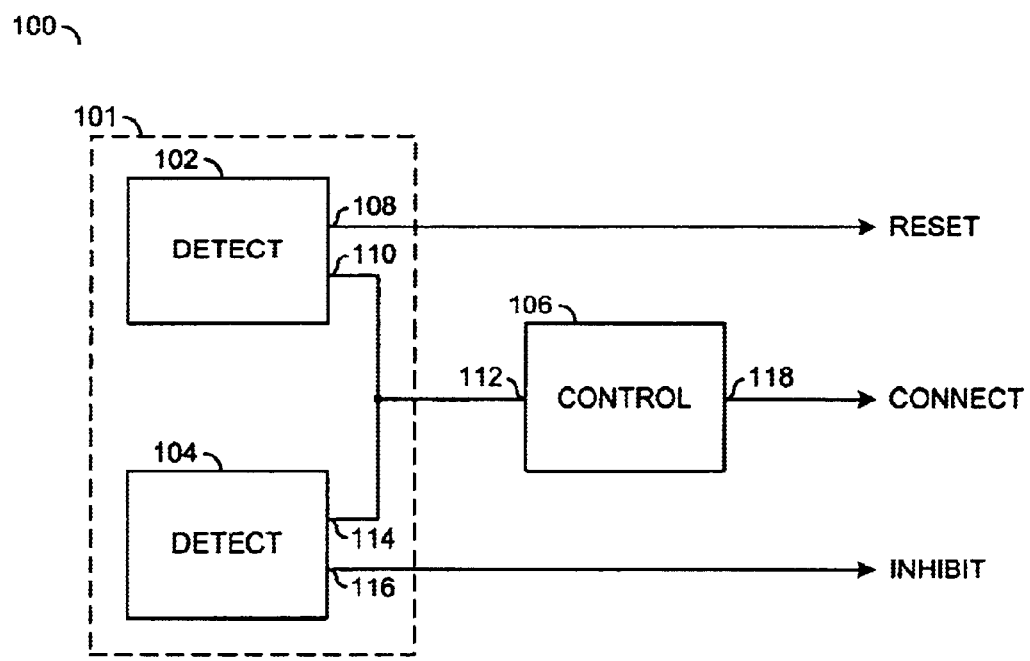
FIG. 2 is a block diagram of the present invention.

Referring to FIG. 2, a block diagram of a circuit 100 is shown in accordance with a preferred embodiment of the, present invention. The structure of the circuit 100 generally comprises a detection block 101 and a control block (or circuit) 106. In one example, the detection block 101 and the control block 106 may be implemented as a single circuit. The circuit 100 is shown comprising a single control circuit (e.g., the control block 106). However, more than one control circuit may be implemented in order to meet the criteria of a particular implementation. The detection block 101 may comprise a detect block (or circuit) 102 and a detect block (or circuit) 104. The detect block 102 may have an output 108 that may present a signal (e.g., RESET). Additionally, the detect block 102 may have an output 110 that may be connected to an input 112 of the control block 106. The detect block 104 may have an output 114 that may be connected to the input 112. Additionally, the detect block 104 may have an output 116 that may present a signal (e.g., INHIBIT). The control block 106 may have an output 118 that may present a signal (e.g., CONNECT). The control block 106 may generate the signal CONNECT in response to the detect blocks 102 and 104. The signal. CONNECT may indicate an electrical disconnect and reconnect of the external peripheral device 54.

Figure 3:
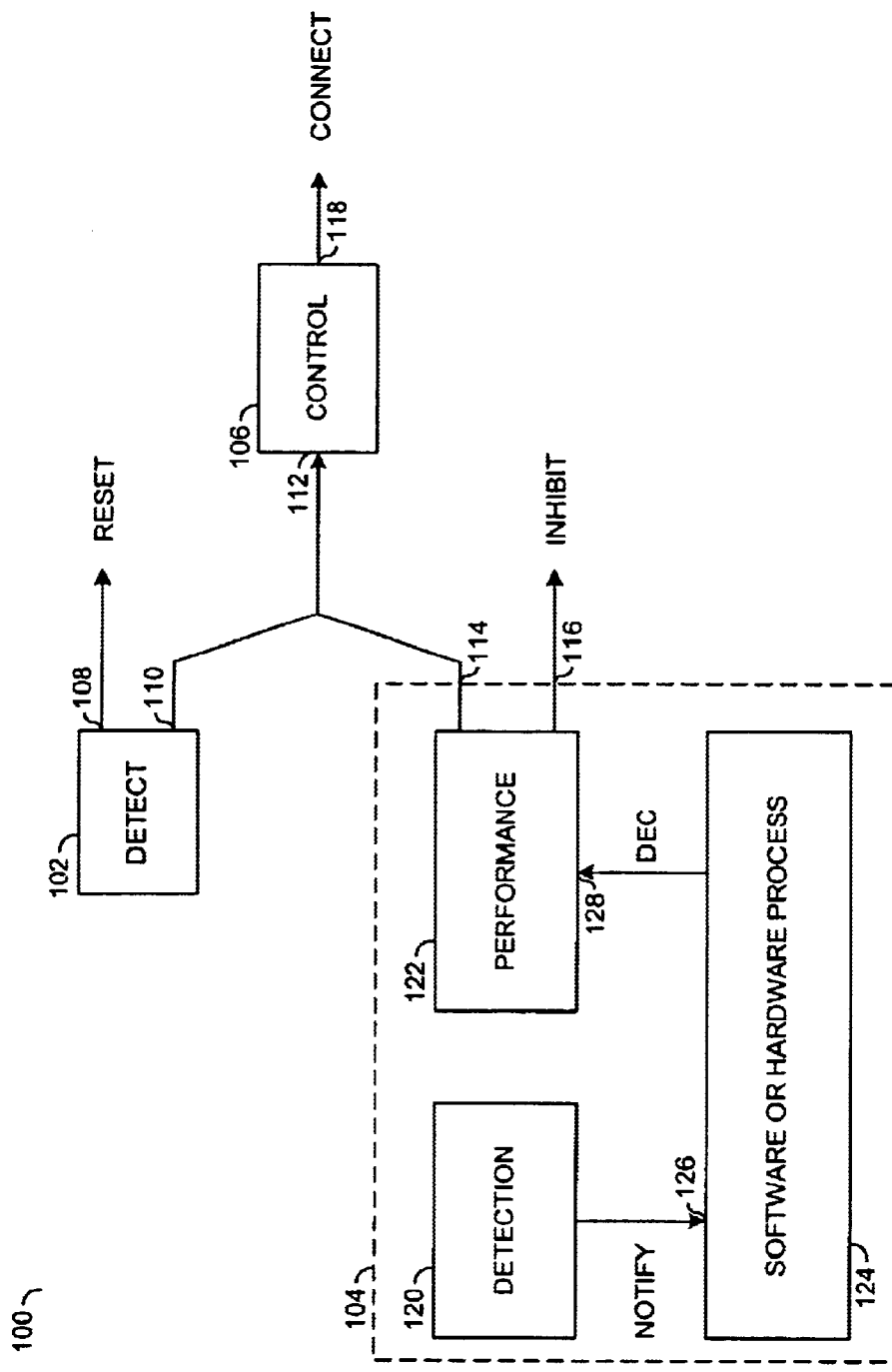
FIG. 3 is a more detailed block diagram of the present invention.

Referring to FIG. 3, a detailed block diagram of the circuit 100 is shown. The detect block 102 may be implemented, as a software crash detection block. In one example, the software crash detection block 102 may comprise a watchdog timer. The software crash detection block 102 may detect memory access violations, illegal operation codes, memory errors and/or other software errors/crashes. In general, the detect block 102 may periodically check for such errors. If the detect block 102 determines that an error is a catastrophic error, the signal RESET may be initiated (or asserted). If the detect block 102 determines that the error is not catastrophic, a signal may be presented to the control block 106. A detailed description of an operation of the detect block 102 will be described in more detail in connection with FIGS. 3 and 4.

The various signals are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

The detect block 104 may be implemented as a performance and data integrity error detection block. The detect block 104 may generate the signal INHIBIT to force the attached peripheral device 54 to a slower performance mode (e.g., USB 1.1 speed at 12 mbit/sec). The detect circuit 104 generally comprises a detection circuit 120, a performance block (or circuit) 122, and a process block (or circuit) 124. The detection block 120 may be implemented either independently or in combination with the process block 124. In one example, the detection block 120 may be implemented as an error rate detection block, the performance block 122 may be implemented as a degraded performance mode circuit and the processor 124 may be implemented in software or hardware. However, the detection block 120, the performance block 122 and the processor block 124 may each be implemented as another appropriate type device in order to meet the criteria of a particular implementation.

The detect block 120 may be implemented, in one example, to detect protocol violations, encoding rule violations, CRC errors, etc. If such errors are determined and/or detected, an interrupt signal (e.g., NOTIFY) may be presented to an input 126 of the process block 124. The process block 124 may analyze the interrupt error (e.g., the signal NOTIFY) and present a signal (e.g., DEC) to an input 128 of the performance block 122. The performance block 122 may be configured to generate the signal INHIBIT in response to the signal DEC. Additionally, the performance block 122 may present a signal to the control block 106 via the output 114.

The performance block 122 may be configured to control the speed of the peripheral device. For example, if the signal NOTIFY indicates that the peripheral device should operate in a slower mode, the speed of the peripheral device is generally inhibited (via the signal INHIBIT and the signal NOTIFY). If the signal NOTIFY indicates that a disconnect/reconnect should be initiated, a signal is presented to the control block 106. Changing the speed of the peripheral device 54 from the USB 2.0 speed to the USB 1.0 speed generally requires a disconnect/reconnect.

The control block 106 generally electrically disconnects and reconnects the peripheral device to the host computer (via the signal CONNECT). An example of such a control circuit can be found in U.S. Pat. No. 6,012,103, which is hereby incorporated by reference in its entirety.

Figure 4:
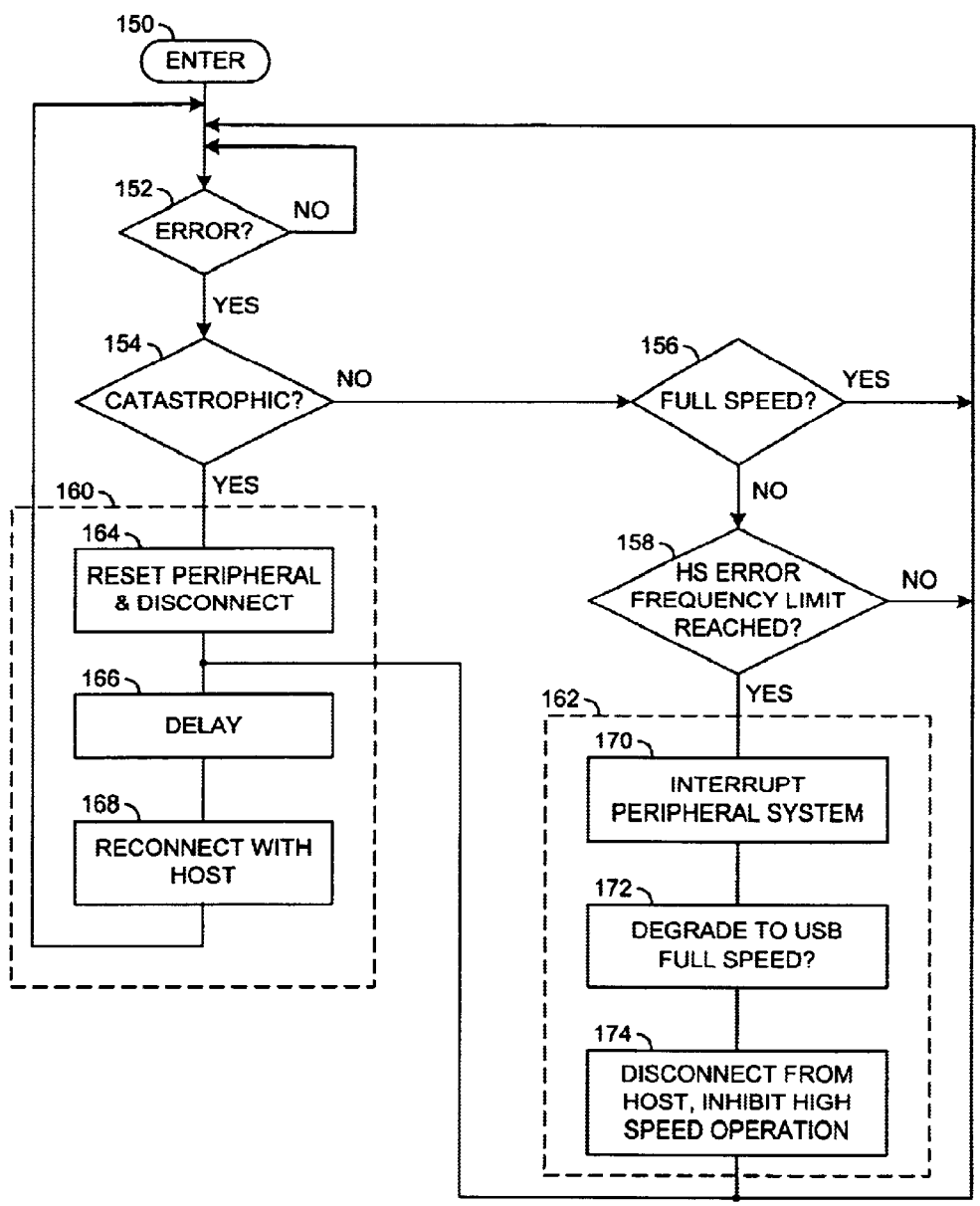
FIG. 4 is a flow chart illustrating an operation of the present invention.

Referring to FIG. 4, a flow chart of a detection method (or software) 140 is shown in accordance with a preferred embodiment of the present invention. The detection method 140 may allow a peripheral device to (i) remain operational and (ii) operate at an optimal configuration. The detection method 140 generally comprises an enter state 150, an error block 152, a decision block 154, a decision block 156, a decision block 158, a processing block 160 and a processing block 162. The processing block 160 generally comprises a reset block 164, a delay block 166 and a reconnect block 168. The processing block 162 generally comprises an interrupt block 170, a degrade block 172 and a disconnect block 174.

The detection method 140 may provide recovery from catastrophic software crashes. When a reset of a processor of the peripheral device occurs (reset block 164), the detection method 140 may provide clean removal of pending software tasks with an outside system (e.g., pending peripheral device tasks). The clean removal may be provided by initiating an electrical disconnect from the host and a reset of the peripheral device. The clean reset may be provided by the detection method 140 via the processing block 160. The detection method 140 may provide awareness and full recovery of the host computer through a clean restart of host software and/or hardware of the peripheral device 54. The detection method 140 may not require additional human intervention to recover the peripheral device 54. The detection method 140 may provide an automatic disconnect and reconnect of the peripheral device 54. In one example, the peripheral device 54 may be implemented as a Universal Serial Bus (USB) device. The USB device may be compliant with the USB specification version 1.0 (published November 1996), the USB specification version 1.1 (published September 1998), and/or the USB specification version 2.0, published April 2000 each of which are hereby incorporated by reference in their entirety.

The detection method 140 may allow for "graceful" degradation when a high error rate is detected. The detection method 140 may not affect a configuration of the peripheral device in response to a first error. For example, the detection method 140 may change (or shift) the configuration of the peripheral device 54 in response to a second or third error. Additionally, the USB specification may allow stalling or delaying of a peripheral response to avoid unnecessary software and/or hardware conflicts. The detection method 140 may reduce high data transfer error rates. The detection method 140 may provide increased reliability that may be achieved through "graceful degradation" of performance. For example, the detection method 140 may provide a shift from a first configuration (e.g., USB 2.0 speed) to a second configuration (e.g., USB 1.1 speed), or vise versa. The shifting of the detection method 140 may allow the peripheral device 54 to remain operative despite performance and data integrity errors.

The system 100 may provide fault tolerance and error recovery for all USB peripherals (e.g., low speed, full speed, high speed, etc.). The system 100 may achieve graceful performance by providing degradation when high error rates are occurring (e.g., with USB 2.0 peripherals). The system 100 may be configured to switch to a lower speed (e.g., USB 1.1) after an initial connection. Additionally, the system 100 may be configured to switch to a high speed after an initial connection, if the high speed is viable with a particular configuration. The system 100 may notify a user of a configurations witch where applicable.

The system 100 may provide a practical approach to implementing unattended peripheral devices. The system 100 may not require human intervention to maintain operation. The circuit 100 may allow for continued operation under a variety of commonly encountered USB peripheral problems. Some of the encountered problems may be isolated events (e.g., an electrical spark upsetting the code execution of a microprocessor and thus causing the program to crash). Other such problems may be chronic (e.g., high performance data transfer becoming corrupted due to an electrically marginal cable).

For isolated events, the system 100 may implement a watch dog timer (e.g., detect block 102). The watch dog timer 102 may be implemented with software that may actively and repeatedly load a timer. Upon an expiration of a count of the timer 102 (e.g., due to a lack of load service from the software), the timer 102 may initiate the control block 106 to electrically disconnect from the host, reinitialize and then reconnect with the host. In this manner, the circuit 100 may react as if the faulty peripheral was physically disconnected and reconnected.

For chronic communication errors (e.g., protocol violations) having a high frequency of occurrence, the system 100 generally allows for the option of graceful degradation, where a more reliable operation configuration may be maintained by switching to a lower performance transfer rate (e.g., switching from a high speed USB transfer at 480 mbit/sec to a low speed USB transfer at 12 mbit/sec). The circuit 100 may respond to protocol errors by initiating the control circuit 106 to provide the electronic disconnection and reconnection (via the signal CONNECT) The system 100 may also be configured to not re-attempt to reconnect the USB peripheral device at the high speed performance configuration due to prior communication errors.

When a USB peripheral that is capable of high-speed USB (e.g., USB 2.0) is connected to a host though a cable having poor electrical characteristics, data errors may occur. Such data errors may occur for a number of reasons such as the length of the cable being too long, absence of magnetic shields, out-of specification drivers, noise levels radiated onto the cable, etc. Such errors typically cause the peripheral device to cease operation. Additionally, the errors may cause an increase of downtime, returned products, technical support calls and a generally bad user experience for conventional USB peripheral manufacturers. The system 100 may reduce such conventional manufacture concerns. The system 100 may be capable of adapting to the electrically degraded environment by providing reduced performance configuration of the peripheral device (e.g., USB 1.1), as opposed to shutting down entirely.

The system 100 may be implemented with combinations of protocol error rate monitoring circuits and other error detection circuits, that invoke an USB re-initialization or re-numeration (as described in U.S. Pat. No. 6,012,103). Errors and/or events which cause a complete re-numeration of the peripheral device may either re-attempt to connect at a previous performance level of the peripheral device or, based upon the cause of the re-numeration, may gracefully degrade the performance in order to reliably operate.

For catastrophic error recovery the system 100 may reset the peripheral device through an electrical mimic of physical disconnection and reconnection from the host computer. The system 100 may provide hardware reset of the peripheral device and software reset of the host. The system 100 may provide a reconnection of the peripheral device that may allow for a clean reinstallation and full recovery of the peripheral device.

For high data error rate recovery the system 100 may provide graceful degradation of the peripheral device to provide uninterrupted operation. The system 100 may provide detection of unacceptable transmission error rates. The system 100 may re-established connection of the peripheral device at a lower speed (USB 2.0 to USB 1.1). The system 100 may provide the lower speed connection through an electrical disconnect from the host and a reconnection at the USB 1.1 rate. The system 100 may notify a user of a configuration of the peripheral device (e.g., notify of USB 1.1 or USB 2.0 speed).

The function performed by the detection method 102 of FIG. 4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a circuit configured to present a connection signal, wherein said connection signal is configured to shift a configuration of a peripheral device in response to one or more errors; and
    a timer configured to periodically determining an operation of said peripheral device.

2. The apparatus according to claim 1, wherein said peripheral device comprise an Universal Serial Buss (USB) device.

3. The apparatus according to claim 1, further comprising a detect circuit configured to detect performance and data integrity errors.

4. The apparatus according to claim 1, further comprising a detect circuit configured to detect performance and data integrity errors.

5. The apparatus according to claim 4, wherein said detect circuit is further configured to determine a performance of said peripheral device.

6. The apparatus according to claim 5, wherein said detect circuit is further configured to (i) shift said configuration if said performance is of a non-optimal configuration and (ii) not shift said configuration, if said performance is of an optimal configuration.

7. The apparatus according to claim 6, wherein said configuration comprises either (i) a high speed configuration or (ii) a full speed configuration.

8. The apparatus according to claim 5, wherein said detect circuit comprises a detection circuit, a performance circuit and a process circuit, wherein said performance circuit is configured to shift said configuration.

9. The apparatus according to claim 8, wherein said detection circuit is configured to notify said process circuit in an event of an error and said process circuit is configured to control said performance circuit.

10. The apparatus according to claim 9, wherein said detection circuit comprises an error rate detection circuit, said processor comprises a software or hardware processor and said performance circuit comprises a degraded performance mode circuit.

11. A system comprising:

a host; and a peripheral device connected to said host, wherein said system automatically shifts a configuration of said peripheral device in response to one or more errors; and a timer configured to periodically determine an operational of said peripheral device.

12. A method for interfacing a peripheral device to a host, comprising the steps of:

(A) connecting said peripheral device to said host;

(B) automatically shifting a configuration of said peripheral device in response to a predetermined criteria; and (C) periodically determining an operation of said peripheral device.

13. The method according to claim 12, wherein said peripheral device comprises an Universal Serial bus (USB)) device.

14. The method according to claim 12, wherein said method further comprises determining a performance of said peripheral device.

15. The method according to claim 14, wherein said method further comprises (i) shifting said configuration if said performance is of a non-optimal configuration and (ii) not shifting said configuration if said performance is of an optimal configuration.

16. The method according to claim 15, wherein said configuration comprises either (i) a high speed configuration or (ii) a full speed configuration.

17. The method according to claim 12, further comprising the step of:

(C) resetting a processor of said peripheral device.

18. The method according to claim 12, wherein step (B) comprises the sub-steps of:

(B-1) presenting a notification messages when an error occurs; and (B-2) controlling step (B) in response to step (B-1).

19. A computer readable medium containing instructions to execute the steps of claim 12.

* * * * *